United States Patent [19]

Pavlopoulos et al.

[11] 4,336,047
[45] Jun. 22, 1982

[54] METHOD FOR FABRICATING SINGLE-MODE AND MULTIMODE FIBER OPTIC ACCESS COUPLERS

[75] Inventors: Theodore G. Pavlopoulos; Daniel E. Altman, both of San Diego, Calif.

[73] Assignee: The United States of America as represented by the Secretary of the Navy, Washington, D.C.

[21] Appl. No.: 222,113

[22] Filed: Jan. 2, 1981

[51] Int. Cl.$^3$ .................... C03B 23/20; G02B 5/14
[52] U.S. Cl. .......................... 65/3.31; 65/3.3; 65/4.21; 65/32; 350/96.15; 350/96.34; 134/15
[58] Field of Search ................ 65/3.3, 3.31, 4.2, 4.21, 65/32; 350/96.15, 96.34; 134/15

[56] References Cited

U.S. PATENT DOCUMENTS

| | | | |
|---|---|---|---|
| 4,173,393 | 11/1979 | Maurer | 65/3.3 |
| 4,291,940 | 9/1981 | Kawasaki et al. | 350/96.15 |

FOREIGN PATENT DOCUMENTS

2822022 12/1978 Fed. Rep. of Germany ... 350/96.15

OTHER PUBLICATIONS

Ozeki et al.; "Tapered Section of Multimode Cladded Fibers ...", Applied Physics Letters; vol. 26, No. 7; Apr. 1, 1975; pp. 386-388.
Kawasaki et al.; "Low Loss Access Couplers ...", Applied Optics; vol. 16, No. 7; Jul. 1977; pp. 1794-1795.
Pinnow et al.; "Hermetically Sealed High Strength Fiber ...", Transactions IEEE of Japan; vol. E61, No. 3; Mar. 1978; pp. 171-173.
Rawson et al.; "Star Couplers Using Fused ... Fibers", Electronic Letters; vol. 14, No. 9; Apr. 27, 1978; pp. 274-275.

*Primary Examiner*—Richard V. Fisher
*Attorney, Agent, or Firm*—Robert F. Beers; Ervin F. Johnston; Thomas Glenn Keough

[57] ABSTRACT

A method of coupling at least a pair of optical fibers together assures predictable coupling ratios and structural integrity. First, the fibers are prepared by coating or dispersing a material (e.g., a metal oxide) on or in them to control the surface tension of their exposed surfaces so that fusion occurs within predictable, extended periods of time. Next, the fibers are twisted together to assume a mutually helical relationship and to apply a small tensional stress on them and they are placed in an inert gas maintained at a predetermined pressure. A coaxially disposed tungsten coil heats them and fuses the twisted, stretched fibers together to effect a desired coupling. Stretching the twisted fibers as they are being fused together creates uniform tapered sections which are needed to induce proper coupling. The rate of heating and fusing, the inert gas and its pressure, and the force exerted during stretching are all factors determinative of the degree of coupling. These factors are more precisely regulatable due to the addition of the material such as metal oxide that controls the surface tension of the of the fibers to be coupled.

10 Claims, 5 Drawing Figures

| COUPLER | $P_1$ (mW) | $P_3$ (mW) | $P_4$ (mW) | $C_{1-3}$ (%) | $C_{1-4}$ (%) | $R_1$ (%) | $R_2$ (%) | L(%) (dB) |
|---|---|---|---|---|---|---|---|---|
| a | 0.377 | 0.148 | 0.135 | 41 | 36 | 54 | 46 | 75 (-1.24) |
| b | 0.455 | 0.225 | 0.082 | 49 | 18 | 73 | 27 | 68 (-1.71) |
| c | 0.485 | 0.198 | 0.082 | 41 | 17 | 71 | 29 | 58 (-2.38) |
| d | 0.423 | 0.040 | 0.035 | 9 | 8 | 53 | 47 | 18 (-7.51) |
| A | 0.400 | 0.147 | 0.097 | 37 | 24 | 60 | 40 | 61 (-7.15) |
| B | 0.278 | 0.072 | 0.039 | 26 | 14 | 65 | 35 | 40 (-3.98) |
| C | 0.430 | 0.110 | 0.030 | 26 | 7 | 78 | 22 | 33 (-4.87) |
| D | 0.440 | 0.071 | 0.032 | 16 | 7 | 69 | 31 | 23 (-6.31) |

FIG.3 TWO-CHANNEL FIBER COUPLERS FABRICATED WITH FIBERS WITH COATING REMOVED (a,b,c, and d) AND WITH COATING NOT REMOVED (A,B,C, and D).

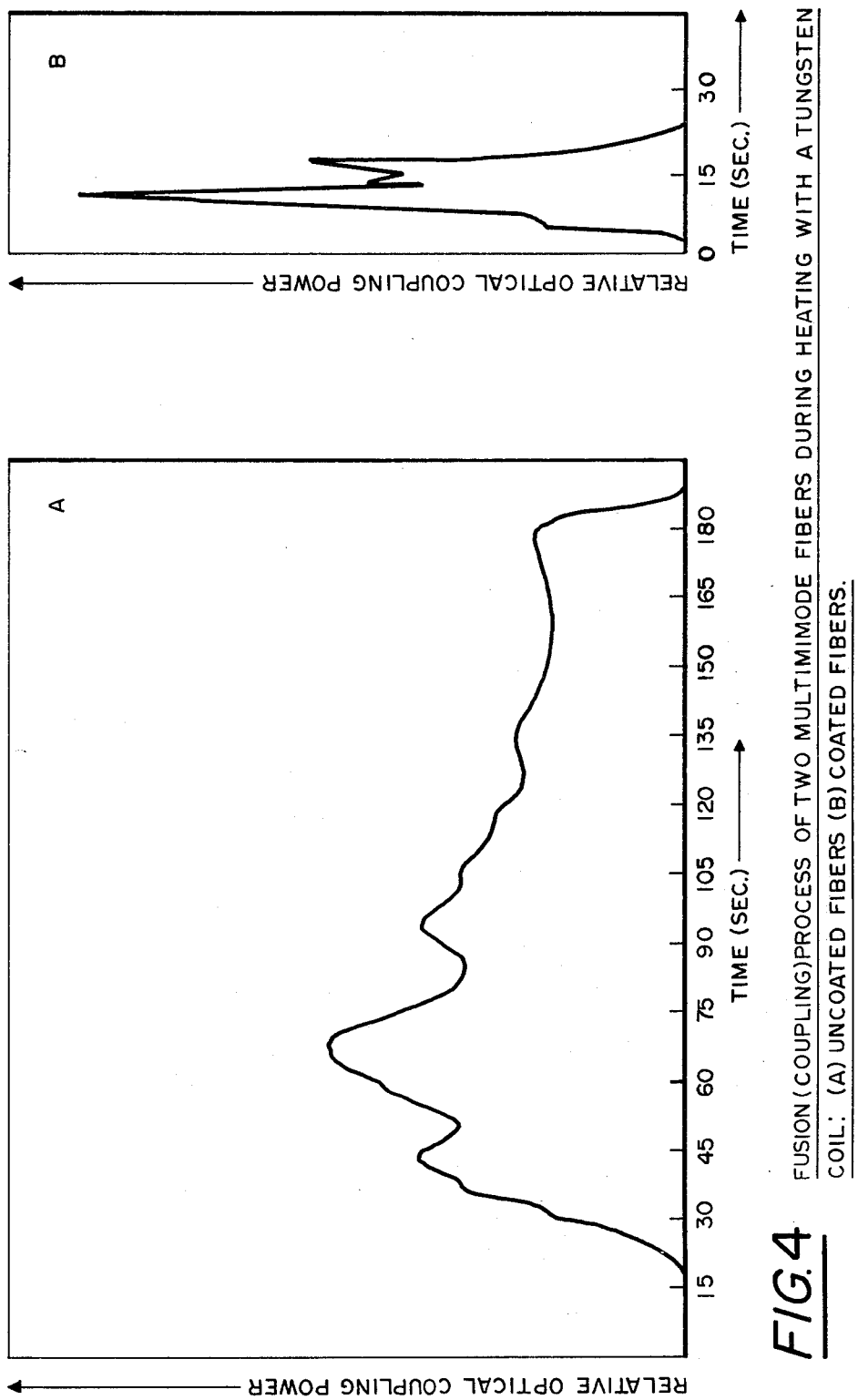
FIG. 4 FUSION (COUPLING) PROCESS OF TWO MULTIMODE FIBERS DURING HEATING WITH A TUNGSTEN COIL: (A) UNCOATED FIBERS (B) COATED FIBERS.

METHOD FOR FABRICATING SINGLE-MODE AND MULTIMODE FIBER OPTIC ACCESS COUPLERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Recently, single-stranded multimode and single-mode optical fibers have seen increased application in communications and many other related systems. Consequently, the fabrication of optical fiber circuit elements, such as access couplers for interconnecting separated terminals, has gained in importance. Several successful methods for producing low-loss access couplers using multimode single-stranded optical fibers have been developed. Two rather simple procedures relied upon in the fabrication of low-loss access couplers (excess loss of the order of 1 dB) for multimode fibers were recorded by Barnoski and Friedrich in the Applied Optics 15, 2629 (1976) and by Ozeki and Kawasaki in Applied Physics Letters 28, 528 (1976).

The first method employs a CW $CO_2$ laser to fuse two sections of multimode fibers side-by-side. The power coupling transmission coefficient was 6.6%. The second method uses two biconically tapered multimode fibers to form a coupler by cementing these fibers side-by-side with an optical adhesive. The two biconical sections are produced by pulling a multimode fiber while it is being heated by a circular tungsten wire (such a technique is disclosed in the article appearing in Applied Physics Letter 26,386 (1975) by T. Ozeki, T. Ito and T. Tamura). While the second method reported values of 62 and 79% for throughput and 4.6 and 9.6% for power coupling transmission coefficients, improved very low-loss access couplers (less than 1 dB) and coupling ratios up to 24% were reported by Kawasaki and Hill in Applied Optics 16, 1794 (1977) using a combination of the two methods referred to above. This produced a tapered coulper fabricated by fusing the two twisted fibers under stress with the aid of an oxy-butane microtorch. A partial explanation as to the reason why the twisted, tapered biconical couplers provide efficient performance is given in the Ozeki-Kawasaki Applied Physics Letter article identified above.

Further improvements of the multiport directional couplers have evolved using Kawasaki and Hill's latest technique. E. G. Rawson and A. B. Nafarrate further demonstrated this technique and their article appearing in the Electronics Letters 14, 274 (1978) discloses that efficient multiport star couplers were obtained by twisting several fibers under tension and fusing them with the aid of a microtorch.

Unfortunately the couplers, while being satisfactory to one degree or another when made in the laboratory under controlled personally supervised individual operations, did not lend themselves to a relatively predictable fabrication sequence which could be duplicated for mass production of a multitude of such couplers. Thus, there is a continuing need in the state-of-the-art for a method for producing fiber optic couplers which is cost efficient and which provides controllable, predictable, acceptable coupling ratios between at least two fibers while assuring their structural integrity.

SUMMARY OF THE INVENTION

The present invention is directed to providing a method of fabricating an access coupling between at least two optical fibers. First, there is the preparing of the fibers to control the surface tension of their exposed surfaces. This preparing is the treating of the fibers by optionally coating the exposed surfaces, e.g. with a material such as metal oxide or dispersing the metal oxide through at least the protective coatings and possibly the claddings of the fibers. Placing the fibers in a side-by-side relationship and twisting them together in a mutually helical relationship allows the disposing of the twisted fibers in an inert gas at a predetermined pressure. Next, there is the fusing of the fibers. After a proper time, the fused fibers are stretched to effect a desired coupling so that the coupling coefficient can be controlled and accurately determined. Furthermore, the stretched melting of the fibers while fusing provides a tapered transition to and from the coupling area to assure proper coupling.

An object of the invention is to provide an improved method for fabricating a fiber optic coupling.

Another object of the invention is to provide a method of coupling optical fibers that relies on preparing the fibers to control their surface tensions.

Another object is to provide a method for fabricating a fiber optic coupler that treats the fibers with a compound, such as metal oxide, prior to stretching and fusing.

Still another object is to provide a method of fabricating a fiber optic coupling that calls for the coating of a metal oxide on the fibers' exposed surfaces tp assure more controlled fusing and predictable coupling.

Yet another object is to provide a method for fabricating a fiber optic coupling having a material or compound such as metal oxide dispersed through at least a portion of the fibers' claddings to assure a more predictable and controlled coupling therebetween.

A further object is to provide a method of reducing fibers' surface tensions by dispersing a material or compound such as metal oxide in the fiber's protective coating by ultrasonic means.

Another object is to provide a method for reducing fibers' surface tensions by depositing a metal oxide by vacuum depositing means.

Still a further object is to provide a method of reducing fibers' surface tensions by dissolving a metal oxide in the claddings during manufacture.

Yet another object is to provide a method of making a fiber optic coupling in which fibers having prepared surfaces are subjected to a simultaneous fusing and stretching to form tapers and to achieve a desired coupling and structural integrity.

Yet a further object is to provide a method for fabricating a fiber optic coupling which is adaptable to multimode and single mode fibers.

These and other objects, advantages and novel features of the invention will become apparent from the following detailed description of the invention when considered in conjunction with the accompanying drawings.

BRIEF DESCRIPTION OF THE DRAWINGS

FIG. 3 is a table of parameters.

FIG. 4 at A and B shows graphical representations provided by uncoated and protective coated fibers.

DESCRIPTION OF THE PREFERRED EMBODIMENT

The concept of this invention relies on simultaneously performing two steps. The first step calls for the heat fusion of two or more fibers with the aid of a tungsten coil in an inert atmosphere within a vacuum system for instance, within a bell jar. Secondly, the improved method calls for there being a pulling of the fibers while melted (fusing) to form the tapered fiber sections. It is significant that the fusing process is monitored by measuring the optical coupling between the two fibers as they are being fused. Then the fibers are stretched. The latter step is initiated after the fibers have started to fuse together, that is, after optical coupling between the two fibers has been observed. The proper timing of this step is of great importance for fiber coupler performance and reproducibility. The improvement of this invention is directly concerned with assuring the proper timing of the fusing and stretching steps.

Figure 1:
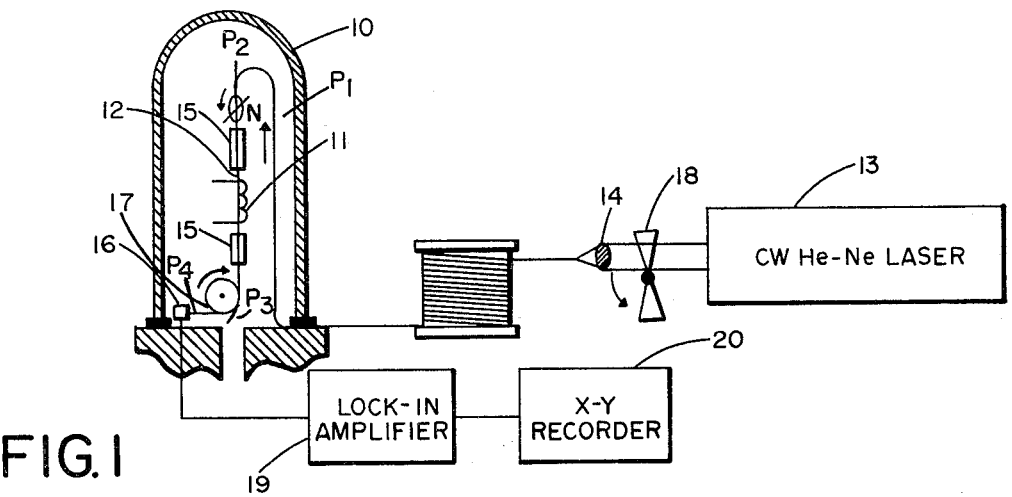
FIG. 1 is a schematic representation of the operative interrelated constituents of the invention.

Referring now to FIG. 1 of the drawings, the optical coupler of the method of this invention was formed under the bell jar 10 of an associated vacuum system, the latter not being shown to avoid cluttering the drawings. A tungsten coil 11 measuring approximately one and one-half centimeters long was shaped to have approximately twelve turns and the inner diameter of the coil measured approximately one-half centimeter. A pair of fibers were twisted together in about a four-turn twist 12 to ensure close contact and strain between the two fibers. Fusion of the fibers was performed in a pure argon atmosphere at one atmosphere pressure although other inert gases can be expected to function suitably. Varying the pressure of the inert gas may influence the controlling factors affecting the fusion and coupling of the fibers.

Referring once again to FIG. 1, about one hundred meters of the graded index fiber were wound on a spool. The fiber is one of the many varieties of multimode or single-mode fibers commercially available from a number of sources. The fiber may be provided with a protective coating of urethane or equivalent material to encase and protect a core-and-cladding optical fiber.

Light from a continuous wave He-Ne laser 13 was coupled into the end of the fiber with the aid of a twenty-one power microscopic objective lens 14. The other end of the coiled fiber was introduced into the bell jar. Care was taken not to crack or otherwise break the fiber as it extended past the flange of the bell jar by including a rubber seal and, as an aid to assure the vacuum, a vacuum grease was provided. Further care was taken not to damage the fibers by including small capillary tubes 15 to guide the fiber through the middle of the tungsten coil and toward a silicon photodetector 16, which also is located inside the bell jar.

Figure 2:
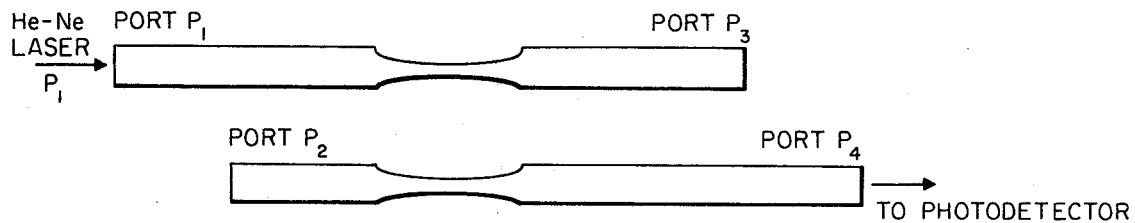
FIG. 2 depicts a typical pair of fibers used in a two-fiber coupling.

Forming a twisted section 12 of fibers calls for cutting off about thirty centimeters of the fiber from where it extends to the detector. This forms a length of fiber having a free end port $P_2$ and an output end port $P_4$, see FIG. 2. This $P_2$-$P_4$ length is wrapped about a length $P_1$-$P_3$; $P_1$-$P_3$ is a continuous extension of the fiber wound on the fiber spool. The overlapping adjacent fibers were given a four-turn twist by a needle N above the upper capillary tube. The needle, first, separated the fibers and, secondly, was used to twist them to ensure close contact and strain on the two fibers.

After passing through the lower capillary tube, the fibers were taped to a two centimeter diameter cylinder 17 fabricated, for example, from a material having the properties of the material known as Teflon by DuPont. The cylinder was attached to the shaft of a commercially available slow speed electric motor, not shown in the drawings. The motor offered a controlled method exerting a variable pulling force and stretching the fiber to any desired length. In the several examples discussed below the fused fibers were stretched about one-half centimeter along their heated lengths.

To monitor the optical coupling between the two fibers during the heating (fusion) process (the pathway defined between ports $P_1$-$P_3$ and the pathway $P_2$-$P_4$), it is necessary to discriminate against the bright white light emitted from the heating coil (tungsten coil) which is trapped and propagated by the fibers. Such discrimination is made by using a light chopper 18 which chops the laser light and a lock-in amplifier 19 for selecting only the chopped component of photodetector current. This information is fed to an XY recorder 20 which provides a visual readout.

Referring once again to FIG. 2, a schematic representation of the two lengths of the fiber show the ports, $P_1$, $P_2$, $P_3$, $P_4$, which are located according to the arrangement depicted in FIG. 1. $P_1$ represents the entire He-Ne laser power input entering at port 1; $P_2$ shows a substantially unused port where the fiber was broken; $P_3$ is a continuation of the $P_1$ associated fiber and port $P_4$ gives an indication of the coupled laser light power monitored at photodetector 16.

A number of tests were made with the arrangement shown in FIG. 1 using a typical off-the-shelf multimode graded index fiber manufactured by Corning under the product designation of Product 4040. For this particular fiber, the attenuation at 820 nanometers is 3.8 dB per kilometer, the numerical aperture is 0.204 and the nominal fiber diameter is 125 microns. The fiber was mounted and tested in accordance with the structure shown in FIG. 1 and for test purposes of the information provided in FIG. 3, the port designations were the same as set out in FIG. 2. In the sequence of tests of a number of the fibers, after one coupler was removed from the bell jar, traces of deposited tungsten and tungsten oxide were removed with a solution containing hydrochloric acid and nitric acid.

The fibers were evaluated by measuring the power (in milliwatts) from ports 3 and 4 for the two-channel fiber coupler with a power meter. $P_1$ was measured in the usual way by breaking the fiber at port 1 after testing of an individual fiber. Before all the measurements, mode stripping solvent manufactured by Borden Inc. under the Tradename of Krylon was applied to all fiber ports.

Referring to FIG. 3, the optical performance of a number of two channel fiber couplers are presented, each according to the following parameters: throughput coefficient $C_{1\text{-}3}(\%) = P_3/P_1 \times 100$; powering coupling transmission coefficient $C_{1\text{-}4}(\%) = P_4/P_1 \times 100$; coupling ratios $R_1(\%) = P_3/(P_3+P_4) \times 100$ and $R_2(\%) = P_4/(P_3+P_4) \times 100$; and excess insertion loss $L(\%) = (P_3+P_4)/P_1 \times 100$.

In the process of collecting the data of FIG. 3, it appeared that the first step in the fiber coupler fabrication process would be the fusion of the two fibers. A series of experiments were performed to determine the current necessary to heat a typical tungsten coil to the proper temperature needed to soften and fuse the two fibers together. In the interest of precision the tungsten filament voltage was permitted to increase slowly. With the slow increase no coupling was observed although the temperature generated by the tungsten coil was sufficiently high to melt the fibers. This demonstrates the first indication of the importance of the surface condition (contamination) of the fibers to assure a controlled fiber fusion. Apparently, as the tungsten coil slowly rose in temperature, sufficient tungsten and tungsten oxide would deposit on the surface of the fibers and inhibit fiber fusion. The fibers would melt and pull apart without any coupling being observed. A further conclusion became possible in that touching the fibers with unclean fingers possibly also had contributed to the fiber surface contamination. To reduce the effects of this latter possibility the fibers were handled with plastic tweezers.

To further verify the contaminating effects of the tungsten and tungsten oxide that were attributed to slow heating, fusion of fibers was repeated but the tungsten filament voltage was increased as quickly as possible to a setting that quickly caused fiber softening. Coupling was observed between the two fibers. FIG. 4 at A shows a recording trace of the coupling (fusion) process between two fibers. On four different runs the time until coupling (fusion) started was 15, 30, 50 and 85 seconds. The duration of the coupling (fusion) was 130, 155, 105 and 90 seconds (the coupling process terminates when the two fiber cores melt (fuse) together and pull apart).

Neither the time of the start of fusion (coupling) or the coupling duration was very reproducible under the conditions that prevailed during the conditions thusly described. This again points to the significance of surface contamination of the fibers and the effect of this factor on the surface tension of the molten fibers. In addition, the recorder traces of the three other runs of the fusion process were not identical to the one presented for further examination of FIG. 4 at A.

Apparently, the fiber fusion mechanism or process depends critically on the surface tension of the surfaces of the fibers. Upon heating, quartz does not soften gradually, as glass does, but becomes soft rather suddenly. If the tungsten coil is heated slowly, deposition of coil outgassing products (tungsten and some tungsten oxide) will occur in sufficient amounts on the fibers' surfaces to prevent fiber fusion. The fibers will melt without any coupling being observered. Applying the heat at a faster rate to the fibers' surfaces will deposit small amounts of material on the fiber surface, increasing the surface tension of the quartz to allow a gradual fusion and a consequent long optical coupling (fusion) process. Because of the critical dependence on the amount and the composition of the deposition products, the fusion process is not very reproducible with an untreated fiber.

To complete the fabrication of the fiber couplers, the fused portion was stretched to produce the required taper by rotating cylinder 17 and removing the tungsten filament voltage. The stretching of the fibers was started at approximately 15 seconds after coupling between the two fibers was observed on XY recorder 20. Referring back to FIG. 3, data is presented on four different fiber couplers in which the protective coating is removed (a, b, c and d). The couplers are of moderate loss and it should be noted that two of the couplers show coupling ratios between the fibers approaching 3 dB.

Handling the fibers after the protective coatings had been removed to expose the claddings and cores during the fiber coupler fabrication proved difficult since the uncoated fibers were easily broken. To avoid the frequent breakage of the fibers, the fusion experiment was tried with fibers that each retained the protective coating concentrically outwardly of the cladding and core. A typical coupling (fusion) curve is presented in FIG. 4 at B. On four different runs the time until coupling (fusion) started was 5, 5, 5 and 6 seconds. The duration of the coupling (fusion) process was 9, 10, 11 and 12 seconds.

The representation of FIG. 4 at B shows a sharp coupling maximum which was also present and substantially identical in the three other runs. It is apparent that the onset of the coupling process and the coupling duration are both very abrupt, indicating sudden onset and fast completion of the fiber fusion process. The heat causes the fiber's protective coating to evaporate. This evaporation prevents the deposition of any material from the heated coil on the fiber; hence a rather clean fiber surface is created after all the protective coating has evaporated to provide a melted quartz that will have a rather low surface tension. The low surface tension is the cause of the fast onset and the short duration of the fiber fusion process.

Consequently, the fast onset of coupling, after setting the proper heater current, and the short duration of the couplings made the timing of the second step (stretching step) of the fabrication of the fiber coupler difficult. The stretching step was immediately initiated and the current was cut off as soon as coupling was observed on the recorder. Data is presented in FIG. 3 on four different couplers in which the protective coatings are not removed (A, B, C and D). Although one coupler had a coupling ratio close to 3 dB and one was of low loss, the coupling parameters were not very reproducible.

In view of these results, certain observations became apparent. Using fibers without protective coatings made handling difficult. However, tungsten coil deposits increased surface tension sufficiently to allow sufficient time to initiate the stretching process. Due to small variations of the material deposited on the fibers, on the other hand, onset and duration of the fusion process varied, making reproducible fiber coupling data difficult. When coated fibers were used, handling was easy. However, the fast onset and duration of the fusion process made the timing of the stretching step difficult, giving rise to fiber couplers with wide variations in coupling data.

To overcome all these problems it is the essence of the invention to provide the fibers with a surface treatment or a coating. The fibers' surfaces should be treated with a material such as one of the metal oxides, for example, zinc oxide, tin oxide, sodium oxide, etc. deposited on their surface by vacuum depositing, dispersed in the protective coating by ultrasonic means or dissolved in their protective coating and cladding during manufacture. Irrespective of what means is chosen the material or compound such as metal oxide increases the surface tension of the fiber in a controllable and reproducible manner. This assures that the onset of fusion as well as the time of duration of the fiber fusion is reproducible and that the other parameters, such as the initiation of the stretching process can be varied to obtain any desired coupling ratio.

The treatment of the fibers' surfaces helps assure automation of the production process, especially the start and duration of the timing of the stretching step to improve the reproducibility of the fiber coupling parameters. Specifically the temperature of the tungsten heating coil can be monitored by measuring its temperature (color) with a pyrometer and to maintain the proper coil temperature the heating current can be adjusted accordingly. In addition, there are other fiber production parameters such as fiber twist, tungsten coil length and stretching length of the fibers as well as the constituents and pressure of the inert atmosphere that, optionally, are variable to give a designer flexibility in determining the coupling ratios close to 3 dB which were nearly attained with earlier processes; however, after surface tension has been controlled in accordance with the addition of suitable amounts of suitable metal oxides, fine tuning of stretch, twist and argon pressure could be relied upon to aid in assuring the production and reproducibility of any desired fiber coupling parameters.

Although the disclosure has dealt nearly exclusively with multimode fibers and their coupling, it is clear that single-mode fiber couplers could be produced in accordance with these teachings. Although single-mode fibers have generally the same outer diameter dimensions as multimode fibers, their cores are much smaller; consequently, the fusion process should take longer, that is until the small cores touch or nearly touch each other and terminate coupling during the fusion process. Using protective coated single-mode fibers might be even more successful since more coupling (fusion) time should be available to initiate the fiber stretching process. In addition, the stretching step might be eliminated altogether. Furthermore, varying the heating coil length could automatically vary the single-mode fiber coupling length (in accordance with accepted theory) and, by simply controlling the coupling length, for example, the length of the tapered portion of the fiber (one should be able to readily control coupling ratios, frequencies of interest, and the like).

From the foregoing description it is apparent that the addition of the metal oxide provides for the controlled timing of the fusion process while the fibers are being lengthened. In addition to assuring a better fusion of the fibers, the stretching or lengthening process creates a taper which makes a smooth transition to and from the fibers where they are optically coupled. This gradual taper prevents the creation of weakened spots which could otherwise compromise the structural integrity of the fiber.

Figure 5:
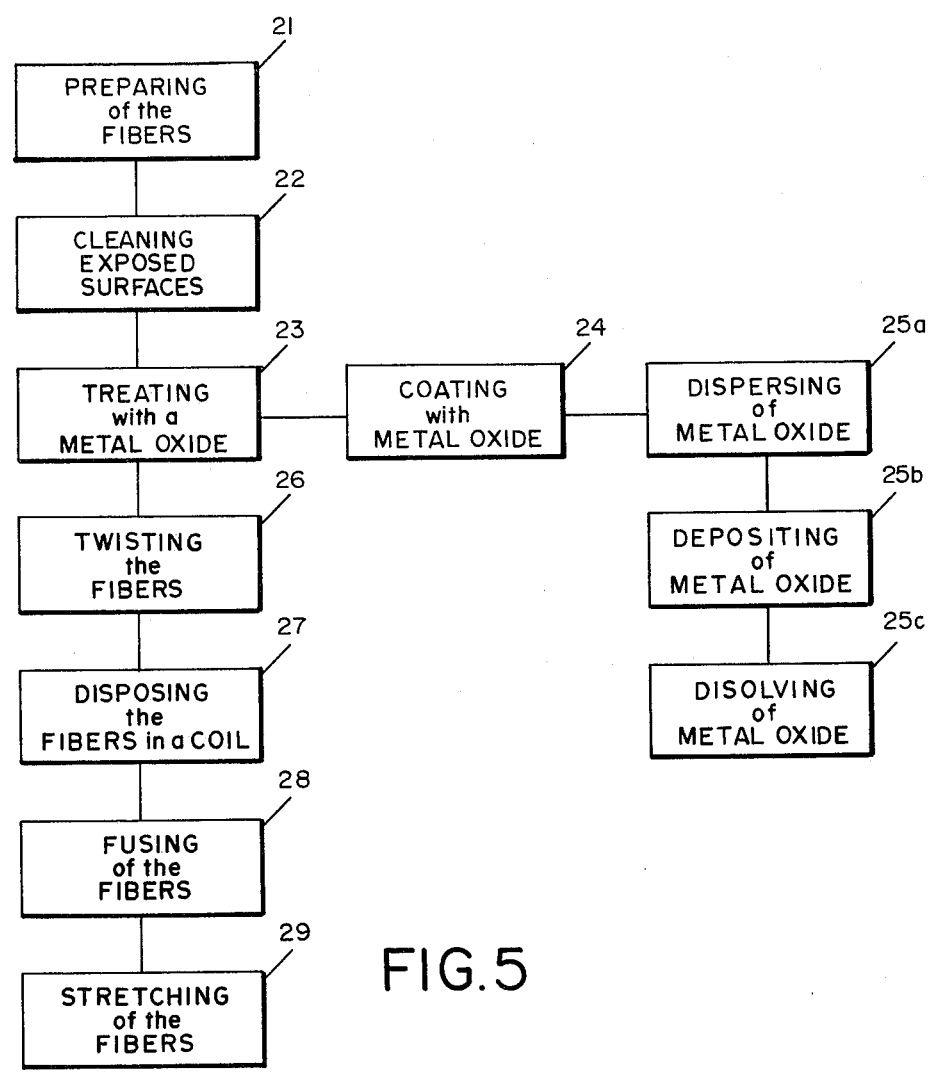
FIG. 5 is a block diagram drawing of the method of the invention.

Looking to FIG. 5 of the drawings there is shown in block diagram form a representation of the inventive concept of this invention. First there is a preparing 21 of the fibers to control their surface tension. This involves the cleaning 22 of the surfaces as well as the treating 23 of the fibers with a metal oxide to produce an acceptable surface tension. The treating with metal oxide can be the coating 24 of the surface with a metal oxide or the dispersing 25a of the metal oxide by ultrasonic means, the depositing 25b of the metal oxide by vacuum deposition or the dissolving 25c of the metal oxides throughout the protective coating and/or the cladding of the fiber. Next, there is a twisting 26 of the fibers together over a predetermined length and the disposing 27 of the fibers in a twisted coil in a side-by-side relationship in an inert gas. Next, there is the fusing 28 of the twisted fibers within the coil as it is heated and the simultaneous stretching 29 of the fibers and a turning off of the current to achieve the desired coupling ratios.

Obviously many modifications and variations of the present invention are possible in light of the above teachings. It is therefore to be understood that within the scope of the appended claims the invention may be practiced otherwise than as specifically described.

What is claimed is:

1. A method of fabricating an access coupling between at least two optical fibers each having a core and a cladding, comprising:

preparing the fibers to control the surface tension of their exposed surfaces;

placing the fibers in a side-by-side relationship;

twisting the fibers together to assume a mutually helical relationship;

disposing the twisted fibers in a twister coil in an inert gas at a predetermined pressure;

fusing the twisted stretched fibers together in a vacuum to effect a desired coupling and stretching the twisted fibers.

2. A method according to claim 1 in which the steps of stretching and fusing are simultaneously performed to assure a desired degree of coupling while simultaneously assuring a stretched tapering of the fibers to and from their mutual coupling lengths to thereby maintain an acceptable structural integrity.

3. A method according to claim 2 in which the step of preparing the fibers includes the cleaning of the fibers in a suitable cleaning agent and the steps of fusing the twisted stretched fibers includes heating them with a coaxially disposed tungsten coil.

4. A method according to claim 3 in which the step of preparing the fibers includes the treating of the fibers with a compound of a metal oxide to produce an acceptable surface tension of the fibers that uses a more predictable coupling during the time it takes for the steps of stretching and fusing.

5. A method according to claim 4 in which the step of treating includes depositing a metal oxide on the exposed surfaces of the fibers.

6. A method according to claim 4 in which the step of treating includes the dispersing of the metal oxide to the cladding of the fibers by ultrasonic means.

7. A method according to claim 6 in which the fibers are each provided with a protective coating and the metal oxide is dispersed into the protective coatings and the claddings of the fibers by ultrasonic means.

8. A method according to claim 4 in which the metal oxide is deposited on the fibers' surfaces by vacuum depositing.

9. A method according to claim 4 in which the metal oxide is dissolved in the cladding during manufacture of the fiber.

10. A method according to claim 9 in which the fibers are each provided with a protective coating and the metal oxide is dissolved in the protective coatings during manufacture of the fiber.

* * * * *